United States Patent
Turner

(10) Patent No.: US 6,549,119 B1
(45) Date of Patent: *Apr. 15, 2003

(54) ELECTRONIC IDENTIFICATION SYSTEM

(75) Inventor: Edwin Turner, Marlow (GB)

(73) Assignee: International Computers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/582,939

(22) Filed: Jan. 4, 1996

(30) Foreign Application Priority Data

Feb. 15, 1995 (GB) ............................................. 9502907

(51) Int. Cl.$^7$ ................................................ H04Q 1/00
(52) U.S. Cl. ...................... 340/10.5; 340/572.3; 342/42
(58) Field of Search ........................... 340/825.54, 572, 340/573, 825.69, 10.34, 10.5, 572.3; 342/42, 50

(56) References Cited

U.S. PATENT DOCUMENTS

| | | | | |
|---|---|---|---|---|
| 4,512,033 A | * | 4/1985 | Schrock | 340/825.54 |
| 5,241,923 A | * | 9/1993 | Janning | 340/825.54 |
| 5,517,194 A | * | 5/1996 | Carroll | 340/825.54 |
| 5,523,749 A | * | 6/1996 | Cole | 340/825.54 |
| 5,600,323 A | * | 2/1997 | Boschini | 340/825.69 |
| 5,602,535 A | * | 2/1997 | Boyles | 340/825.69 |

FOREIGN PATENT DOCUMENTS

| | | |
|---|---|---|
| EP | 0 453 314 | 10/1991 |
| EP | 0 513 456 | 11/1992 |
| EP | 0 534 559 | 3/1993 |
| NL | 8802718 | 6/1990 |
| WO | WO 87/04282 | 7/1987 |

* cited by examiner

Primary Examiner—Brian Zimmerman
(74) Attorney, Agent, or Firm—Barnes & Thornburg

(57) ABSTRACT

An identification system, e.g. for tagging goods in a retail store, has at least one interrogator and a number of transponders for attaching to goods. Each transponder responds to an interrogation signal from the interrogator by returning a response signal containing information stored in the transponder. The transponder can be switched, by means of a mode switching signal from the interrogator, into a reduced power mode in which the power level of the response signal is reduced from its normal level. The reduced power mode may for example be selected when the goods have been paid for, to ensure that the transponder does not trigger an anti-theft gate, which can detect only the normal power level. The transponder can, however, still be read by an interrogator capable of detecting the reduced power level, e.g. at a customer services desk.

6 Claims, 2 Drawing Sheets

ELECTRONIC IDENTIFICATION SYSTEM

BACKGROUND TO THE INVENTION

This invention relates to an electronic identification system comprising a plurality of transponders, and an interrogator for interrogating the transponders to obtain information stored in the transponders. The invention also relates to a transponder for use in such an identification system. The invention is particularly, although not exclusively, concerned with an electronic identification system using radio frequency (RF) technology for communication between the interrogator and the transponders.

Such an electronic identification system is described for example in European Patent Applications EP 0494114, EP 0585132 and EP 0598624, and in PCT Patent Application WO 93/17404.

Such systems have many potential applications, such as tagging goods, mail, vehicles or animals. For example, such a system could be used in a retail store to identify goods presented by a customer at a checkout. The transponders could be incorporated in tags attached to the goods or to their packaging.

In such a retail application, in order to detect unauthorised removal of goods from the store, an anti-theft gate may be positioned at the store exit, to detect the presence of transponders. It has been proposed in the above mentioned EP 0585132 to disable a transponder for a predetermined period of time (e.g. 10 minutes) after it has been successfully read at the checkout. This ensures that goods that have been paid for do not trigger the anti-theft gate, provided the customer leaves the store within the predetermined period. However, a problem with this is that if the customer later brings the purchased goods back into the store with the transponder still attached, the anti-theft gate will be triggered.

The above-mentioned WO 93/17404 proposes to write information into the transponder at the checkout, to indicate whether the article has been paid for or its removal has otherwise been authorised. This information can then be read at the anti-theft gate, so as to ensure that the anti-theft gate is not triggered by articles that are being legitimately removed from the store, or subsequently brought back into the store. However, a problem with this proposal is that it requires a relatively sophisticated anti-theft gate, capable not only of detecting the presence of a transponder, but also of interrogating it to read the information indicating whether the article has been paid for.

One object of the invention is to provide a novel electronic identification system which is capable of overcoming these problems.

SUMMARY OF THE INVENTION

According to the invention there is provided an identification system comprising at least one interrogator and a plurality of transponders, wherein each of said transponders comprises:
  (a) means for responding to an interrogation signal from the interrogator by returning a response signal to the interrogator;
  (b) means for switching from a first mode to a second mode in response to a mode switching signal from the interrogator; and
  (c) level setting means for setting said response signal to a first power level when the transponder is in said first mode, and to a second, lower power level when the transponder is in said second mode.

DESCRIPTION OF AN EMBODIMENT OF THE INVENTION

One embodiment of the invention will now be described by way of example with reference to the accompanying drawings.

Figure 1:
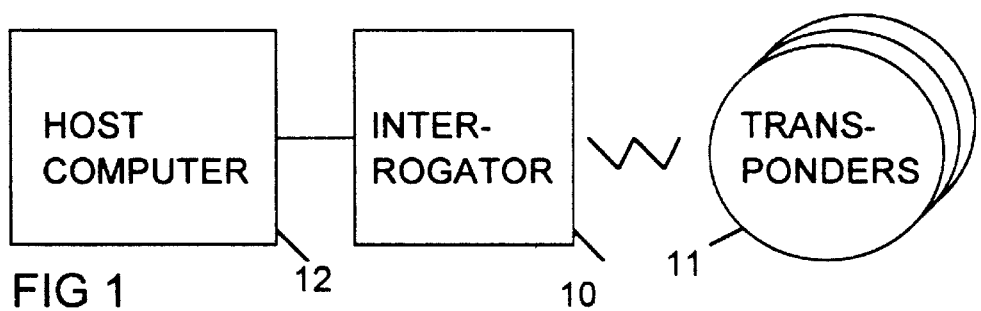
FIG. 1 is a schematic diagram showing an electronic identification system in accordance with the invention.

Referring to FIG. 1, this shows an electronic identification system comprising an interrogator 10 and a plurality of transponders 11. The transponders may, for example, be incorporated into tags or labels attached to goods in a retail store, while the interrogator may be built into a checkout station in the store. The interrogator is connected to a host computer 12.

Figure 2:
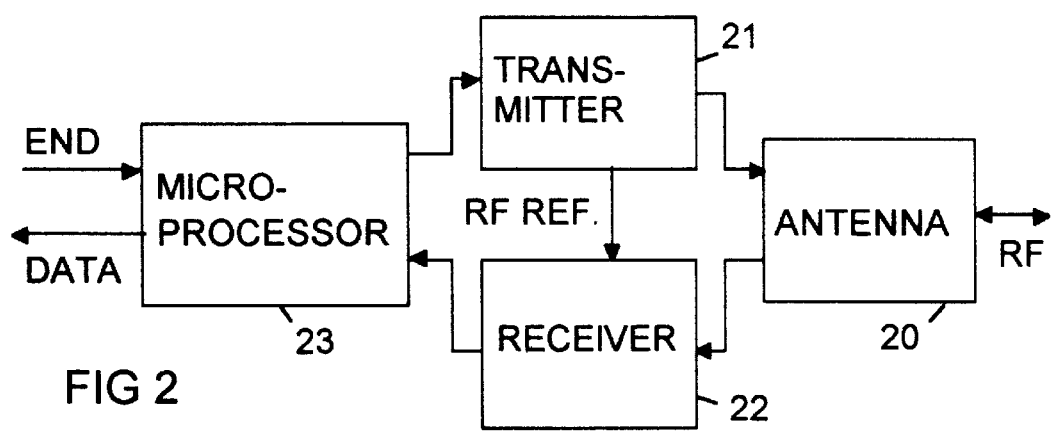
FIG. 2 is a block diagram of an interrogator.

Referring to FIG. 2, this shows the interrogator in more detail. The interrogator comprises an RF antenna 20, a transmitter circuit 21, a receiver circuit 22, and a controlling microprocessor 23. The antenna 20 is connected to both the transmitter and receiver circuits, and serves both for transmission and reception. The transmitter circuit is controlled by the microprocessor and, when powered up, generates an interrogation signal, comprising a continuous RF carrier signal.

As will be described, any transponders that detect the interrogation signal return a response signal, comprising an RF carrier signal modulated with coded data. The response signal is received by the antenna 20, and passed to the receiver circuit 22. The receiver circuit demodulates the response signal, by mixing it with an RF reference signal derived from the transmitter circuit, and passes the demodulated signal to the microprocessor 23 for decoding. The decoded data is then passed to the host computer 12. When the host computer detects that all the transponders have responded (e.g. because a time-out period has expired with no further responses) the host computer sends an END signal to the microprocessor.

Figure 3:
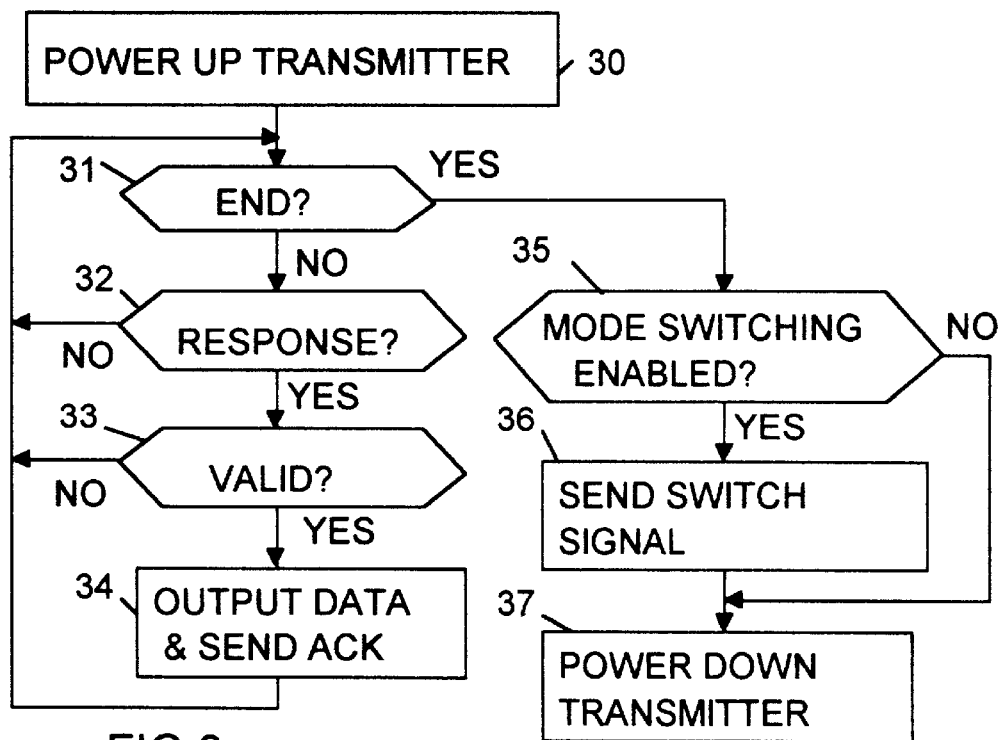
FIG. 3 is a flow chart showing the operation of the interrogator.

FIG. 3 shows a flowchart of the operation of the microprocessor 23. Initially, the microprocessor powers up the transmitter (step 30), so as to start transmitting the interrogation signal. The microprocessor then enters a loop in which it checks whether the END signal is present (step 31) and whether a response signal has been received from a transponder (step 32). When a response is received, the microprocessor decodes it, and performs a redundancy check to check whether the response is valid (step 33). If the response is not valid (e.g. because two transponders have returned responses simultaneously, so that their responses interfere with each other), the response is ignored and the microprocessor returns to await another response. When a valid response is detected, the microprocessor outputs the decoded data to the host computer and instructs the transmitter to send an ACK signal (step 34). The ACK signal consists of an interruption to the interrogation signal for one clock period, and serves as an acknowledgement to the transponder that its response has been correctly received.

The microprocessor then loops back to step 31 to await the next response.

The microprocessor repeats this process until an END signal is received from the host computer at step 31, indicating that responses have been received from all the transponders. It then checks whether or not mode switching is enabled in the interrogator (step 35). If so, a SWITCH signal is sent (step 36). This signal consists of an interruption of the RF carrier for two clock periods, and hence is distinguished from the ACK signal. As will be described, the SWITCH signal switches the mode of each transponder that receives it. If mode switching is not enabled, no SWITCH signal is sent. Finally, the transmitter is powered down (step 37).

Figure 4:
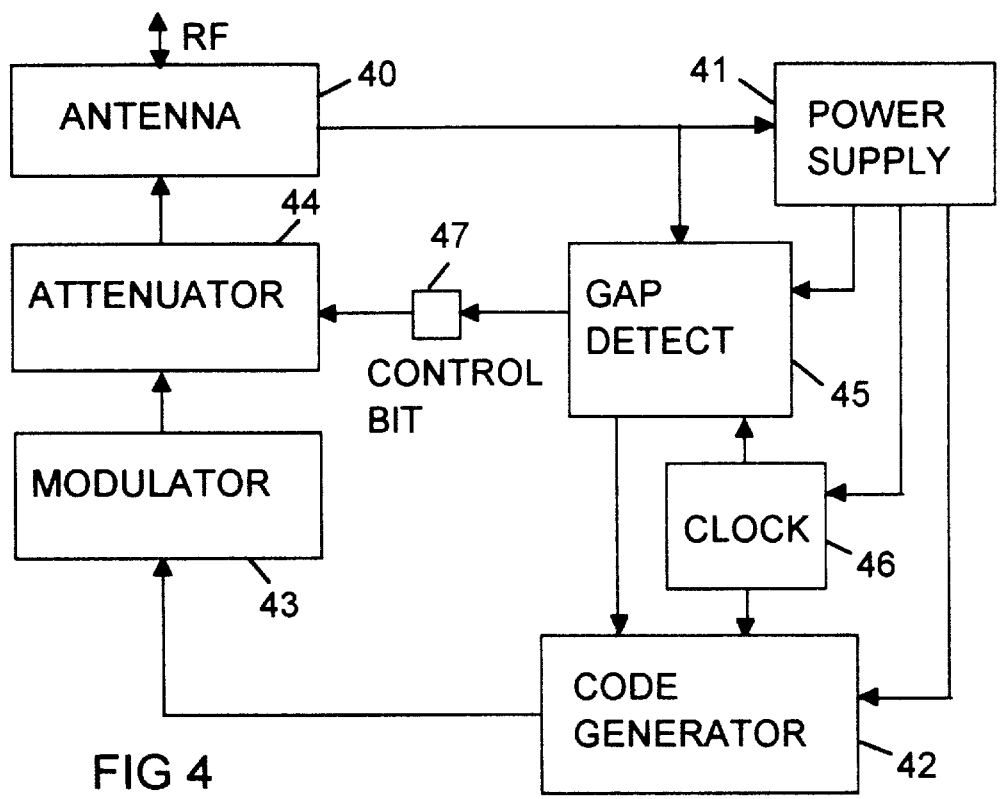
FIG. 4 is a block diagram of a transponder.

Referring now to FIG. 4, this shows one of the transponders in more detail. The transponder comprises an antenna 40, a power supply 41, a code generator 42, a modulator 43, a variable attenuator 44, gap detection logic 45, a clock circuit 46, and a mode control bit 47. The antenna 40 serves for both transmission and reception and may, for example, comprise a printed conductive pattern. The power supply 41 comprises a diode, which rectifies the received RF signal and charges a capacitor. Thus, the transponder derives all its power from the incoming RF signal, and does not require any internal power source. The power supply provides power for the code generator, clock circuit and gap detection logic. The code generator 42 generates a coded signal which represents the information stored in the transponder, such as an identity code. The modulator 43 modulates this coded signal on to the carrier wave received from the antenna, and feeds this modulated carrier by way of the attenuator 44 to the antenna 40, for transmission as a response signal. The gap detection logic 45 detects both ACK signals and SWITCH signals.

The mode control bit 47 is stored in a non-volatile memory, so that it is preserved even when the transponder is powered down. (The non-volatile memory may be of the type which can be re-written, or may be of the type which, once written to, cannot be re-written). The mode control bit controls the variable attenuator 44, such that when this bit is set, the attenuator reduces the power level of the response signal from its normal level to a lower level. In other words, the transponder has two modes: a normal power mode and a reduced power mode. In the normal power mode, the signal level is such that it can be detected by the interrogator from a range of up to 2 metres. In the reduced power mode, on the other hand, the signal level is such that it can be detected only from a range of 10 centimetres or less.

Figure 5:
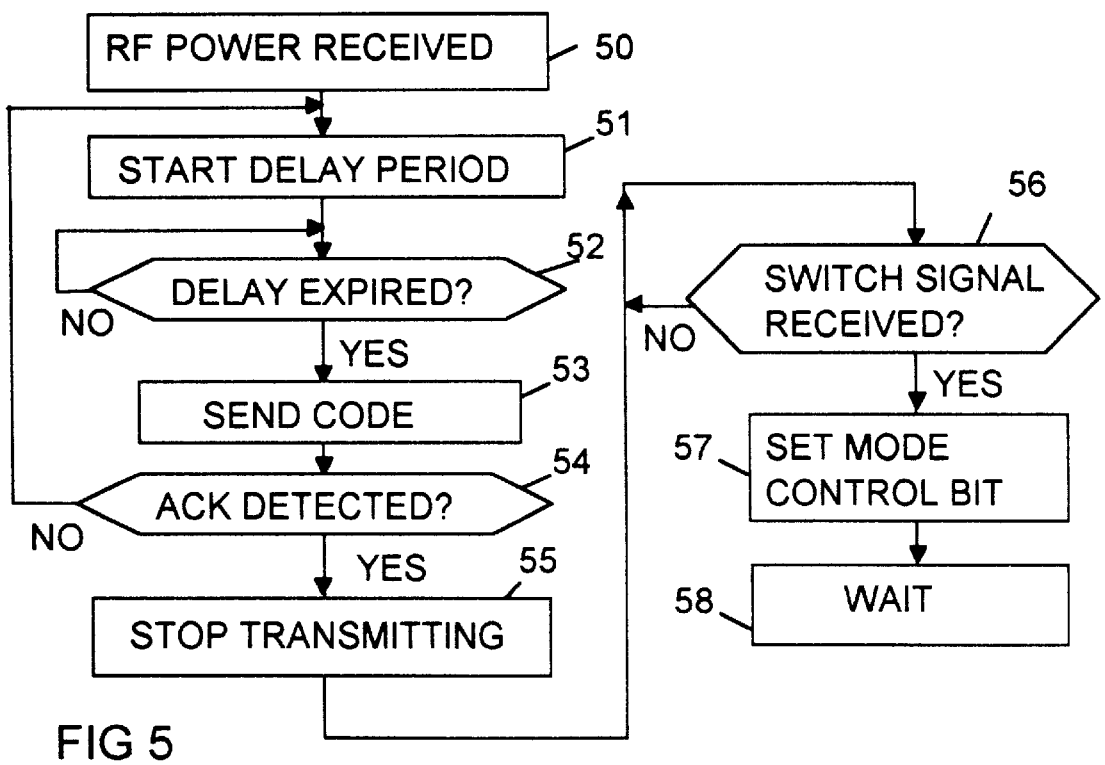
FIG. 5 is a flow chart showing the operation of the transponder.

FIG. 5 is a flowchart showing the operation of the transponder. The code generator is powered up whenever an interrogation signal is received from the interrogator (step 50). When powered up, the code generator starts an internal counter, which generates a preset delay period (step 51). This delay period is chosen at random for each transponder so that, in general, each transponder has a different delay. The transponder then enters a loop (step 52) in which it waits for this delay period to expire. When the delay period expires, the code generator sends its stored code sequence to the modulator for transmission as a response to the interrogation signal (step 53).

The transponder then waits for a predetermined number of clock periods, and then checks whether an ACK has been detected (step 54). If no ACK is detected at the appropriate time, this indicates that the response has not been correctly received by the interrogator, probably because of interference with another transponder. In this case, the transponder returns to step 51, restarting the delay period, and the response is retransmitted after the delay expires. It can be seen that, if the delay periods of the two interfering transponders are different, they will retransmit at different times, and so avoid interference.

When an ACK is detected, code generation is disabled (step 55), so that no further responses are sent. The transponder then enters a loop (step 56), waiting for a SWITCH signal. When a SWITCH is received, the transponder sets the mode control bit (step 57) and then enters an idle loop (step 58), in which it remains until power is removed. If, however, the transponder is powered down before any SWITCH signal is received, the mode control bit remains unset.

A typical application of the identification system described above is in a retail store. Each item for sale in the store has a label, containing a transponder as described above. Each transponder is programmed with an identity code, uniquely identifying the item, and initially all of these transponders are in the normal power mode, i.e. their mode control bits are all unset. When a customer wishes to purchase one or more items, the customer passes the items through a checkout station which contains an interrogator as described above. The interrogator interrogates the transponders, so as to obtain their identity codes, and passes these codes to a point-of-sale computer for pricing. After all the transponders have been interrogated the interrogator sends a SWITCH signal. This switches all the transponders into the reduced power mode by setting their mode control bits. The checkout station may also write information into the transponders, if desired, such as the date of purchase.

The store has one or more anti-theft gates, positioned at the store exits. Each of these gates contains an interrogator, which interrogates any transponders that pass it. The anti-theft gate is designed so that it is impossible to bring any transponder closer than about 15 centimetres to the antenna of the interrogator. This means that any transponder in the reduced power mode will not be detected by the anti-theft gate, because its signal power level is insufficient to be detected over a range greater than 10 centimetres. However, any transponder still in the normal power mode will be detected, and this will trigger an audible or visible alarm.

In summary, it can be seen that when goods are taken through the checkout, their transponders are modified so as to reduce their signal power levels. This ensures that the goods will not erroneously trigger the anti-theft gate when they are taken out of the store, or if they are subsequently brought back into the store (e.g. as an item of clothing worn by the customer). However, it is still possible to interrogate the transponders if required, using equipment that can accept the reduced signal power level. For example, a customer services desk in the store may contain an interrogator, positioned immediately under the counter so that transponders may be brought very close to the interrogator's antenna. Such an interrogator would therefore be able to read the transponders of articles that had been purchased and returned for exchange or refund.

If the non-volatile memory which stores the mode control bit is of the re-writable type, then it is possible for to reset the mode control bit to its initial state, so as to restore the transponder to its normal power mode. This could be done for example if the article is to be put back on the shelves for re-sale.

It will be appreciated that while the embodiment of the invention described above relates to a retail environment, the invention may be used in many different applications.

It will also be appreciated that many modifications may be made to the system described above without departing from the scope of the invention.

What is claimed is:

1. An identification system comprising a plurality of transponders and interrogation means, wherein each of said transponders includes means for responding to an interrogation signal by transmitting a response signal representing information stored in the respective transponder, each transponder being capable of operating in one of two modes, a first mode in which the response signal is at a first power level and a second mode in which the response signal is at a second, lower power level greater than zero, means for initially setting each said transponder in the first mode, and means for switching from the first mode to the second mode in response to a mode switching signal, and wherein the information stored in each transponder is obtainable from the respective response signal irrespective of the power thereof being at the first or the second level, and wherein the interrogation means includes (a) a first interrogator station including means for generating said interrogation signal and means for detecting said response signal at said first power level, and means for generating said mode switching signal for subsequently switching said transponders into said second mode;

(b) a second interrogator station, including respective means for generating said interrogation signal, and means for detecting said response signal at said first power level but incapable of detecting said response signal at said second power level; and c) a third interrogator station, including respective means for generating said interrogation signal, and means for detecting said response signal at said second power level as well as at said first power level and thereby obtaining the stored information from transponders which have previously been switched into said second mode.

2. A system as claimed in claim 1 wherein each said transponder comprises power level setting means including a respective variable attenuator.

3. A system according to claim 1 wherein said interrogation signal, said mode switching signal, and said response signal are all radio frequency (RF) signals.

4. An identification system for use in a retail store, comprising:

(a) a plurality of transponders attached to retail goods, each of said transponders including means for responding to an interrogation signal by transmitting a response signal representing information stored in the respective transponder, each transponder being capable of operating in one of two modes, a first mode in which the response signal is at a first power level and a second mode in which the response signal is at a second, lower power level greater than zero, means for initially setting each transponder in the first mode, and means for switching from the first mode to the second mode in response to a mode switching signal, and wherein the information stored in each transponder is obtainable from the respective response signal irrespective of the power thereof being at the first or second level;

(b) a checkout station, including means for generating said interrogation signal and means for detecting said response signal at said first power level, and means for generating said mode switching signal for subsequently switching said transponders into said second mode;

(c) an anti-theft gate, including respective means for generating said interrogation signal, and means for detecting said response signal at said first power level but incapable of detecting said response signal at said second power level; and (d) a service station, including respective means for generating said interrogation signal, and means for detecting said response signal at said second power level as well as at said first power level and thereby obtaining the stored information from transponders on goods that have previously been passed through a said checkout station and switched to said second mode.

5. A system according to claim 4 wherein said interrogation signal, said mode switching signal, and said response signal are all radio frequency (RF) signals.

6. A method of identifying goods in a retail store, the method comprising:

(a) tagging said goods with a plurality of transponders attached to said goods, each of said transponders initially being set to a first mode of operation in which each of said transponders transmits a response signal representing information stored in the respective transponder at a first predetermined power level in response to an interrogation signal, (b) at a checkout station interrogating said transponders with said interrogation signal to obtain a said response signal from each transponder, and switching each of said transponders into a second mode of operation, in which said response signal represents the information stored in the respective transponder but is reduced to a second power level, greater than zero and lower than said first power level;

(c) at an anti-theft gate interrogating said transponders with said interrogation signal, detecting response signals from said transponders at said first power level and ignoring response signals from said transponders at said second power level, thereby detecting any goods that have not passed through said checkout station while ignoring goods that have passed through said checkout station; and (d) at a service station interrogating said transponders with said interrogation signal and detecting response signals from said transponders at said second power level as well as at said first power level, thereby being able to detect the stored information from transponders on goods which have previously passed through a said checkout station and been switched to said second mode.

* * * * *